US009792101B2

(12) United States Patent
Boudville

(10) Patent No.: US 9,792,101 B2
(45) Date of Patent: Oct. 17, 2017

(54) CAPACITY AND AUTOMATED DE-INSTALL OF LINKET MOBILE APPS WITH DEEP LINKS

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 0 days.

(21) Appl. No.: 14/757,027

(22) Filed: Nov. 10, 2015

(65) Prior Publication Data
US 2017/0131988 A1    May 11, 2017

(51) Int. Cl.
| | | |
|---|---|---|
| G06F 9/445 | (2006.01) | |
| H04L 29/08 | (2006.01) | |
| G06F 9/54 | (2006.01) | |
| G06F 17/30 | (2006.01) | |
| H04L 29/12 | (2006.01) | |

(52) U.S. Cl.
CPC ............ *G06F 8/61* (2013.01); *G06F 9/54* (2013.01); *G06F 17/30861* (2013.01); *H04L 61/305* (2013.01); *H04L 61/35* (2013.01); *H04L 67/02* (2013.01); *H04L 67/10* (2013.01); *H04L 61/15* (2013.01)

(58) Field of Classification Search
None
See application file for complete search history.

(56) References Cited

U.S. PATENT DOCUMENTS

| | | | |
|---|---|---|---|
| 8,433,800 B2 | 4/2013 | Chor | |
| 2006/0086785 A1* | 4/2006 | Sakata | G06F 8/65 235/380 |
| 2008/0016233 A1* | 1/2008 | Schneider | G06F 17/30887 709/230 |
| 2008/0307053 A1* | 12/2008 | Mitnick | G06F 17/30241 709/205 |

(Continued)

OTHER PUBLICATIONS

Yan et al. "Fast app launching for mobile devices using predictive user context." Proceedings of the 10th international conference on Mobile systems, applications, and services. ACM, 2012.*

(Continued)

*Primary Examiner* — Chameli Das
*Assistant Examiner* — Joanne Macasiano

(57) ABSTRACT

Users establish a brand that uses their expertise with a mobile app. A linket is a label for a deep link. A deep link is at minimum 2 items. An id of an app and a network address where the app is run. A Registry maps from a linket to a deep link. A linket can have associated images, audios or videos. The Registry lets users search for linkets. A blockchain can record linkets, later used by an analysis engine to make a social network graph. For a given time slot, a linket owner can define that a maximum number of queries go to a first linket. Other queries go to another person's linket. If a deep link associated with a linket fails to respond, the Registry can be told. It can send a backup deep link to the user device. There can be automated deinstallation of apps used by linkets, when a linket changes its app. A device (Continued)

installs the earlier app via the linket. The device later detects that the linket now points to another app, so the earlier app is no longer used. It can de-install the earlier app or pop-up a dialog to tell the user and ask if it can de-install the app.

19 Claims, 13 Drawing Sheets

(56) References Cited

U.S. PATENT DOCUMENTS

| | | | |
|---|---|---|---|
| 2009/0259552 A1* | 10/2009 | Chenard | G06Q 30/02 705/14.72 |
| 2010/0241962 A1* | 9/2010 | Peterson | G06F 3/0481 715/720 |
| 2013/0110815 A1* | 5/2013 | Tankovich | G06F 17/30867 707/711 |
| 2013/0334300 A1 | 12/2013 | Evans | |
| 2014/0089413 A1 | 3/2014 | Evans | |
| 2014/0229435 A1* | 8/2014 | Palivatkel | G06F 17/30575 707/620 |
| 2015/0113058 A1* | 4/2015 | Zhang | H04L 65/403 709/204 |
| 2015/0154644 A1 | 6/2015 | Saxena | |
| 2015/0156061 A1 | 6/2015 | Saxena | |
| 2015/0317343 A1* | 11/2015 | Cselle | G06Q 10/06 707/741 |
| 2016/0026713 A1* | 1/2016 | Katic | G06F 17/3053 707/709 |
| 2016/0189225 A1* | 6/2016 | Glover | G06F 17/30864 705/14.55 |
| 2016/0321052 A1* | 11/2016 | Sharifi | G06F 8/61 |

OTHER PUBLICATIONS

Yan, Tingxin. "Designing novel mobile systems by exploiting sensing, user context, and crowdsourcing." Diss. University of Massachusetts Amherst, 2012. pp. 43-47.*

* cited by examiner

Figure 2A

Table 1

| Linket | App Id | Date |
|---|---|---|
| Easy ESL | Alpha | 2 March |
| Easy ESL | Beta | 17 April |

Table 2

| Linket | App Id | Date |
|---|---|---|
| Easy ESL | Alpha | 2 March |
| Linda's ESL | Alpha | 4 March |
| Easy ESL | Beta | 17 April |

Figure 11

CAPACITY AND AUTOMATED DE-INSTALL OF LINKET MOBILE APPS WITH DEEP LINKS

REFERENCES CITED

"Apps everywhere but no unifying link" by C. Dougherty, New York Times, 5 Jan. 2015.
"Deep linking's big untapped potential" by M. Thomson, VentureBeat.com, 9 Aug. 2015.
"Generating and presenting deep links" by V. Tankovich et al, US Patent Application 20130110815 (Oct. 28, 2011).
"Methods and systems for facilitating an online social network" by C. Evans, US Patent Application 20140089413 (Dec. 6, 2013).
"Text-synchronized media utilization and manipulation based on an embedded barcode" by C. Evans, US Patent application 20130334300 (Mar. 27, 2013).
"Smart link system and method" by J. Chor, U.S. Pat. No. 8,433,800, (28 Feb. 2011).
"Deep linking to mobile applications" by S. Saxena et al US Patent Application 20150154644 (Dec. 2, 2013).
"Deep linking to mobile applications" by S. Saxena et al US Patent Application 20150156061 (Dec. 2, 2013).

TECHNICAL FIELD

The field is using deep links for mobile apps.

BACKGROUND

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. Facebook Corp. has App Links. Google Corp. has App Indexing and Google Intents. Twitter Corp. has App Cards. Apple Corp. has Apple Extensions. Yahoo has 2 US patents pending. There are also several startups, like Bit.ly, Branch Metrics Corp., Button Corp., Quixy Corp., URX Corp., and Tapstream Corp., each with their own initiatives. The syntax and functionality vary between these company specific efforts.

SUMMARY

Cellphone usage becomes more common globally. The functionality of the cellphone continues to improve. And for many users, the cellphone is their main or only computer. This submission lets users establish an individual or collective brand that uses their expertise with a mobile app, for professional and personal uses.

A linket is defined as a label for a deep link. A deep link is at minimum 2 items. An id of an app and a network address or domain where the app is run. Often the app runs on a mobile device, which is likely to be a cellphone. The address is assigned to the device by the wireless provider or WiFi hot spot. A raw address, in numbers, is hard to remember. And it can change as the user moves. In this sense, a linket functions like a domain name. It is stable and easier to remember. A linket can be written in Unicode, to service all human languages.

A Registry is defined that maps from a linket to a deep link. The analog of the DNS system. But whereas the mapping from a domain to an IP address is expected to be stable over months, the deep link address can change over hours.

A linket can be a user's personal or professional brand. The former can be for her persona in a game if the underlying app is that game. The latter can be where she teaches a subject via the app.

A linket might have an associated image. This might be a photo of the linket owner. Or a graphical trademark (or service mark). The linket could have an associated audio or video. These give more information about the linket owner or the service that the linket can provide. These could be downloaded by users who submit the linket to the Registry.

The Registry can act as a search engine, letting users search for linkets. One criterion is proximity. Return linkets closest to the user's network address. Another criterion is to prefer linkets that do or do not run ad blockers.

A blockchain can record linkets. These can be used by an analysis engine to make a social network graph.

For a given time slot, a linket owner can define that a maximum number of queries go to a first winner's linket. Subsequent queries go to another person's linket. This is a capacity feature of a linket that points to another linket or deep link.

A related idea is a fail over feature. If a deep link does not respond, the device that made the query sends its original linket query to the Registry, along with failBits, which is a set of bits of diagnostics. The Registry can reply with a backup deep link. It can run diagnostics of its own against the failed deep link. It can also tell the owner of the parent link. Who might decide to discontinue referring to that linket or deep link.

A linket can be used for a person to machine (p2m) interaction. A use case is automated testing. A server makes a linket pointing to itself. A user gets the linket and uses the app defined in the linket's deep link to take a test. The results are sent to the server for automated marking. The user input can be to questions where the user answers are marked by computer. Like multiple choice questions.

There can be automated deinstallation of apps used by linkets, when a linket changes its app. A device installs the earlier app via the linket. If the device later re-executes the linket, it can detect that the linket now points to another app, so the earlier app is no longer used. It can de-install the earlier app or pop-up a dialog to tell the user and ask if it can de-install the app.

BRIEF DESCRIPTION OF THE DRAWINGS

FIG. 2A shows an analogy between Microsoft products and the linket and deep link.

FIG. 11 shows a table of linkets and installed apps on a device.

DETAILED DESCRIPTION OF THE PREFERRED EMBODIMENT

Figure 1:
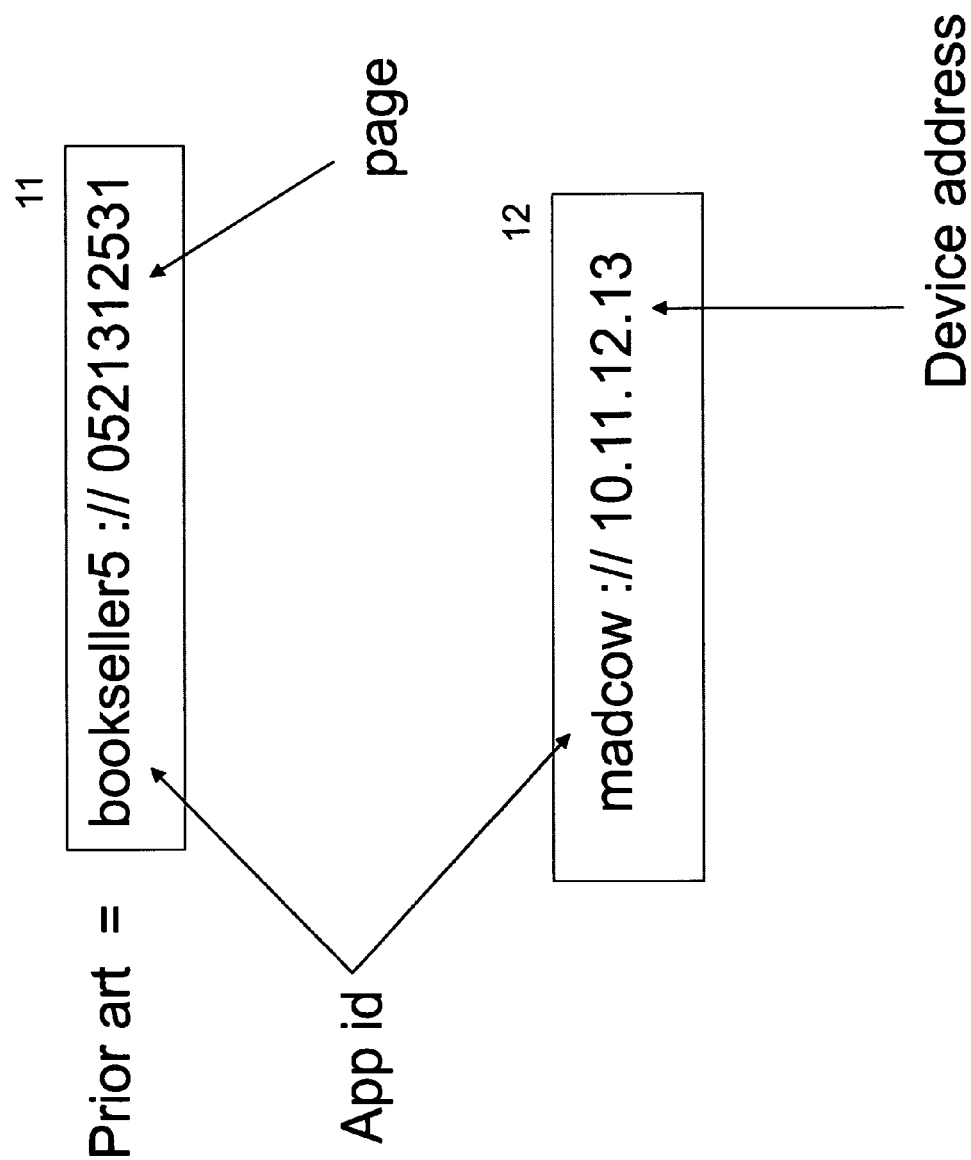
FIG. 1 shows deep links in the prior art and in the present submission.

What we claim as new and desire to secure by letters patent is set forth in the following claims. □

This submission refers to our earlier submissions to the US PTO: "Cellphone changing an electronic display that contains a barcode", filed 16 May 2011, U.S. Pat. No. 8,532,632 ["1"]; □"Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these 5 co-pending applications for deep linking:

"Deep linking of mobile apps by barcode, sound or collision", filed Feb. 18, 2015, U.S. patent application Ser. No. 14/544,763 ["10"], "Cookies and anti-ad blocker using deep links in mobile apps", filed Jun. 8, 2015, U.S. patent application Ser. No. 14/545,694 ["11"];

"Blockchain and deep links for mobile apps", filed Jul. 28, 2015, U.S. patent application Ser. No. 14/756,058 ["12"];

"Different apps on different mobile devices interacting via deep links", filed Aug. 18, 2015, U.S. patent application Ser. No. 14/756,208 ["13"].

"Linket to control mobile deep links", filed October 2015, US patent application ["14"].

We filed 5 earlier co-pending US patent applications 10, 11, 12, 13 and 14, for deep links. We described deep links and ways that these could enhance interactions between two mobile devices near each other. The current submission describes a higher level of use of deep links.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like Apple Corp., Microsoft Corp.), or a provider of an operating system for mobile devices (like Google Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.
1: Introduction;
1.1: Earlier submissions;
1.2: Images, audio and video;
2: Search;
3: Verified linket;
4: Rating a linket;
5: Blockchain;
6: Capacity and failBits;
6.1: Capacity;
6.2: FailBits;
7: Person to Machine (p2m) Interaction;
8: Automated De-install of Linket Apps;
1: Introduction;
1.1: Earlier Submissions;

This submission extends our work in submission 14. We encourage the reader to read "14" for a fuller discussion of linkets. In this section, we summarise our earlier work.

The prior art uses "deep link" to mean two apps running on one mobile device. The first app has a deep link which is selectable by the user. When the deep link is selected, something happens to cause the second app to be installed on the device. Since typically the second app is not present. The second app is run, with an input argument which causes it to start up and show a particular item or "page", rather than just a generic "home page". The "something happens" refers to different ways that different companies have, to enable this.

FIG. 1 is FIG. 1 of submission 14. Item 11 is a deep link in the prior art.

Our deep link, as defined in submissions 10-14, is fundamentally different. It lets 2 mobile devices interact. One major category is one app running on 2 mobile devices. By one app, we mean 2 instances of the app. Another category is 2 apps running on 2 mobile devices. One app runs on one device, another app runs on the other device, and the apps interact. Our deep link is for (though not exclusively) multiuser interactions. The category of one app on 2 devices can be for multiplayer games. Or even a single player game, where the second device runs a second instance of the game in spectator mode. The second device screen shows the game window of the first device. But the second device cannot alter. Read only.

Item 12 is a deep link from our submissions. It has an id of an app, "madcow". But it also has a network address, 10.11.12.13, of a device (like a cellphone) running an instance of madcow. Suppose madcow is a two person game. The first person, Jane, has her phone at that Internet address. She starts madcow. She needs a second player. She picks an option in the game that makes the deep link 12. She sends this perhaps via an electronic message to Bob. In general, he does not have madcow installed on his device. He reads the message in a mobile browser. The browser shows the deep link as a clickable link. Bob clicks it. The browser, perhaps in tandem with the device operating system, installs madcow and runs an instance. Giving it the input 10.11.12.13. This tells Bob's madcow instance to connect to another madcow instance at that address. Jane and Bob now play the game.

We define a "linket" to be the label of a deep link. The linket can be expressed in Unicode. The linket can be case sensitive. Unlike domain names. This improves the readability of expressions. Case sensitivity is moot for languages like Chinese or Hindi which do not have the concept. The linket can have (but not necessarily) white space.

The linket lets individuals have a personal brand associated with themselves. This follows the observation that many (most ?) people in many countries now have cellphones. A user's cellphone becomes an extension of herself, as has been observed. It is the most common type of personal computer in the world.

Hence a person can own a linket. Of course, a corporation can also own a linket.

Another trend observed is the rise of the so-called gig economy, as exemplified by companies like Uber, Lyft and Airbnb letting individuals offer their services. Where the labour market tends to a friction free state. Our linket and the personal branding it offers is another enabler of the trend.

For descriptive simplicity in what follows, we shall write the linket as a string enclosed in quotes. This is meant to describe its string contents in an understandable way that is independent of a choice of format.

Figure 2:
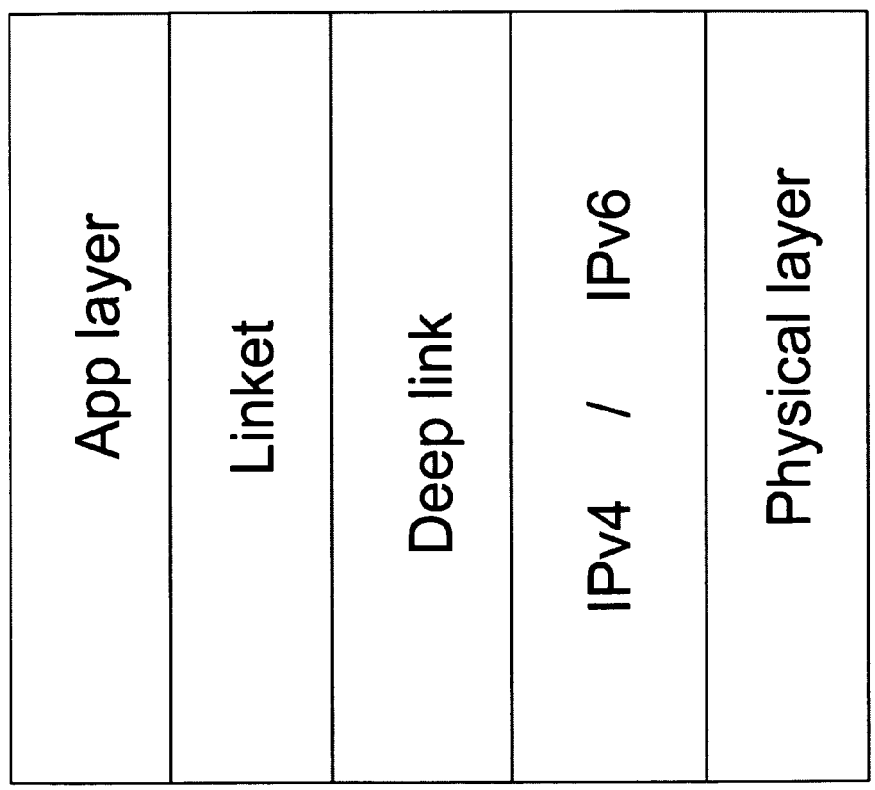
FIG. 2 shows a simplified protocol stack with a linket and a deep link.

FIG. 2 is taken from FIG. 3A of submission 14. FIG. 2 shows a simplified protocol stack. This follows the flavour of the OSI protocol stack and the Internet protocol stack. The lowest layer is the physical layer. Above this is what we term the IPv4 or IPv6 stack. In this, we merge the TCP/UDP layer into the IP layer in the standard Internet protocol stack. The next higher layer is where the deep links sit, where the deep link is defined in our previous submissions and this submission. Above this is the linket layer, which points to the deep link layer. The application layer is the top layer.

The apps in the application layer refer to those apps (mostly but not exclusively mobile) that conform to the descriptions of our submissions. An app does not have to access the linket layer, but can go directly to (i.e. use) a deep link, as per our earlier submissions. Also, an app can of course directly access the IPv4 or IPv6 layers or the physical layer. (At least to the extent that the operating system permits.)

FIG. 2A is an analogy between the Microsoft pair of its Windows™ operating system and Office™ software suite and our deep link and linket. Item 2a1 shows the Microsoft elements.

While item 2a2 shows the deep link corresponding to Windows and the linket to Office. The analogy is not meant to be pursued literally, but it may help in a business context in understanding our deep link and linket.

We stress that in what follows, when we give an example of a linket, it is written enclosed in quotes. But, as described in fuller detail in submission 14, this is a display convention we use in the text and figures. To make it independent of any particular linket implementation.

1.2: Images, Audio and Video;

In addition to what was defined about a linket in submission 14, a linket might also have an associated image. This can be a photo of the linket owner or of a physical product being sold. Or a trademark or service mark. There might be 2 images, where the smaller image functions as a thumbnail or icon. So that depending on the hardware and context of where the linket is shown, the smaller image might be the only image appearing.

An linket can have audio and video. The audio might be a song sample, if the linket refers to a band. The video could be the corresponding music video. Or suppose the linket is about teaching English as a Second Language to native Chinese speakers. The audio could be in Mandarin and English, where the Mandarin explains a context and the English is example audio that demonstrates the teacher's fluency in speaking English.

Our previous submission described a linket as a label of a deep link, where the linket contents might be written in Unicode. This is generalised to a linket being a data structure. One element is the label, as earlier. Another field is an optional image or images. Another field might be an optional audio or audios. With another field being an optional video. Given the larger storage requirements of all these compared to the label, the Registry might charge an extra fee to the linket owner if she wants to upload these.

For brevity in the submission, when we refer to the linket, we shall mean by default the label of the linket. When the image, audio or video parts of a linket are used, these will be explicitly referred to.

The linket owner moves around, likely acquiring new network addresses as she does so. When her device uploads a new address to the Registry, the Registry makes a new deep link with that address, and has her linket point to it. So others can use her (static) linket to contact her at the new deep link. When the Registry gets the new network address, it maps this to an approximate location. Earlier, if the linket owner uploaded several images or audio or video, she could also define different physical regions via geofences. One image is associated with one region, another image is associated with another region etc. Ditto for audio or video. And for one region, there might be only an image, no audio or video. For another region, there might be an image and an audio.

Thus another way that the linket can be used is when a user uploads a linket to the Registry, the Registry might offer a choice of whether to download the deep link or one or more of any image, audio or video.

For example, suppose Jane the linket owner lives in Los Angeles county. When she is in the Silicon Beach suburbs of Santa Monica and Venice, she associates a photo of her at a hackathon held there. When she is in downtown Los Angeles, she associates a photo of her at a startup event in a skyscraper, standing by a window, with the backdrop of the city. She might be a consultant offering her services to technology startups. She uses these photos in part to convey and validate to potential clients her presence in the Los Angeles startup scene.

Now suppose a user Bob uploads the linket to the Registry, and indicates that he wants any associated image, audio or video. The Registry can decide which based on Jane's current deep link or based on Bob's location. If he is outside Los Angeles county, the Registry might pick Jane's photo based on her location. If he is in one of the regions associated with her photos, where the Registry uses his network address to find his approximate location, then it might return the photo of her for that region. The Registry could give Jane an option to let it use Bob's location. Or it might default to only use Jane's deep link to get her location, to decide what image, audio or video to send to Bob.

Jane can also define a default image, audio or video, so if she (based on her deep link) is not in any of the predefined regions, then the Registry would return these defaults to users.

Now suppose Bob uploads a deep link to the Registry, and he wants any associated image, audio or video. This "wants" can be told to the Registry via, for example, a web page (suppose he is interacting with it in a browser) where he pastes the deep link and picks an option to get those assets. The page could have an graphical option where the Registry is to use a location derived from the network address in the deep link, or using his network address. The Registry gets the latter by default from inspecting his Internet packets.

Above, we described regions associated with images, audios or videos. When Jane uploads the assets to the Registry, the user interface she does it through might have options that let her define a region as one or more postal codes, or via the name of a suburb or suburbs. Or there might be some other means, like her manually defining a geofence.

Another way can be simply to use her current location. And this might be done via mapping her network address to a location, or for her device to explicitly upload its location via the user interface. Then, when in future a user wants an associated image, say, the Registry can use a location (from her deep link or from the user's network address) to find the photo whose location is closest to the location. This avoids having Jane having to define regions.

These extra images, audios and videos let a linket owner build her personal brand around her linket.

2: Search;

First, consider what search engines are currently doing with respect to the prior art's understanding of deep links. By search engines, we mostly mean Google, though perhaps Microsoft's Bing engine might do similarly. The current problem is that most apps are not searchable. By searchable, what is meant is not just searching the sequence of bits that constitute the binary of an app, and not searching just any ancillary files in whatever format that might be downloaded to the mobile device with that binary, when the app is installed. What is also implied is a searching of the database on the remote app server, that the app talks to when it runs. Here the prior art considers the common case where the app contacts its app server.

What the prior art deep links mean is that the search engine now has some means of spidering into that app database. Thus the search engine can expand the scope of its searching into hitherto opaque data. We have no dispute with this. But we describe here what else can be done, when our linket and deep link are used.

Suppose Jane has a linket registered with the Registry. When she did so, she might also upload a brief description to the Registry. Similar to what an app developer does when he uploads an app to an app store. Her description could have several fields, like her location, her experience with the app, or her educational background (if applicable). Or her prizes that she won for playing computer games (if applicable).

For transactional apps or uses, the description could include an hourly rate in some currency, and the acceptable means of payment.

Now suppose another user, Sanjay, anywhere in the world, wants to search the Registry for a linket. Or, ultimately, for a currently available deep link that the linket maps to. He runs a program on his device (which typically could be mobile) that does this search. He wants to learn English, so he types 'esl' (English as a Second Language). The program sends the string to the Registry. The Registry can search several databases. One is the information that linket owners wrote in the label of the linket and in the description. Suppose this gives Jane's linket, amongst many others.

The Registry can also look at the apps in those deep links and ask the app stores for their information about the apps. For example, app stores rank results by various means, including, notably, popularity. The Registry can take this ordering, where the most popular apps are returned first, and then apply other criteria to it, like searching its own databases.

When the Registry searches the app stores, it might only search those appropriate to the hardware and operating system of Sanjay's device, to the extent that it knows any information about the latter. So if his device is an iPhone, the Registry searches the Apple app store and not the Android app store.

If appropriate, the Registry can look at the network addresses in the deep links. By mapping those to geographic locations, it could return linkets closer to Sanjay (using knowledge of the location of his network address). Or if Sanjay said he wants linkets in the US, the Registry can ignore linkets outside the US. (Maybe he wants to learn American English.) While the addresses in the linkets are mostly of mobile devices, it can be expected that most devices will stay within a given country, or even smaller regions.

A reason for showing linkets ordered by proximity to Sanjay (to the best extent that this can be determined by the Registry) is that the direct interactions between Sanjay and another linket can be quicker the closer they are. This improves the user experience for Sanjay, and also for the other user, if the other device is being controlled by that user.

Another criterion for sorting linkets is whether a linket can get ads from its ad server or not. And whether the Registry knows if Sanjay can in general get ads. The latter is equivalent to knowing if Sanjay's device runs an ad blocker. The scenario where the ad blocker runs on another device that is Sanjay's device's connection (i.e. gateway) to the Internet is considered to be similar to the ad blocker running on his device. This relates to submission 11 on using a mobile device as an anti-ad blocker. Briefly, the most common method for an ad blocker is where it scrutinises a document that is to be shown in a pop up window or not. It parses any links (these are standard URL links but could be other types as well) and finds the domains in those links. If a domain is on a blacklist of ad server domains used by the blocker, then the blocker blocks the document by not showing it.

Submission 11 uses the configuration that there are 2 devices interacting via an initial deep link and the first device has an ad blocker, and the second device does not. The second device modifies an ad, by rewriting the address in the link that refers to an ad server to now point to the second device. The second device forwards the ad to the first device. The ad blocker on the first device will not find the address of the second device in its blacklist, so the ad will be shown. The second device's app runs a thread that listens on a port. If the user of the first device picks a selectable item on the ad, the interaction goes to the second device, which then forwards it to the actual ad server.

In the current submission, the Registry can use any knowledge it has of linkets pointing to devices not running ad blockers. All else being equal, these linkets are shown first in search results for Sanjay. If this criterion is also used with proximity being desirable, then one way is to sort first by proximity. Then sort by non-ad blocker status.

Figure 3:
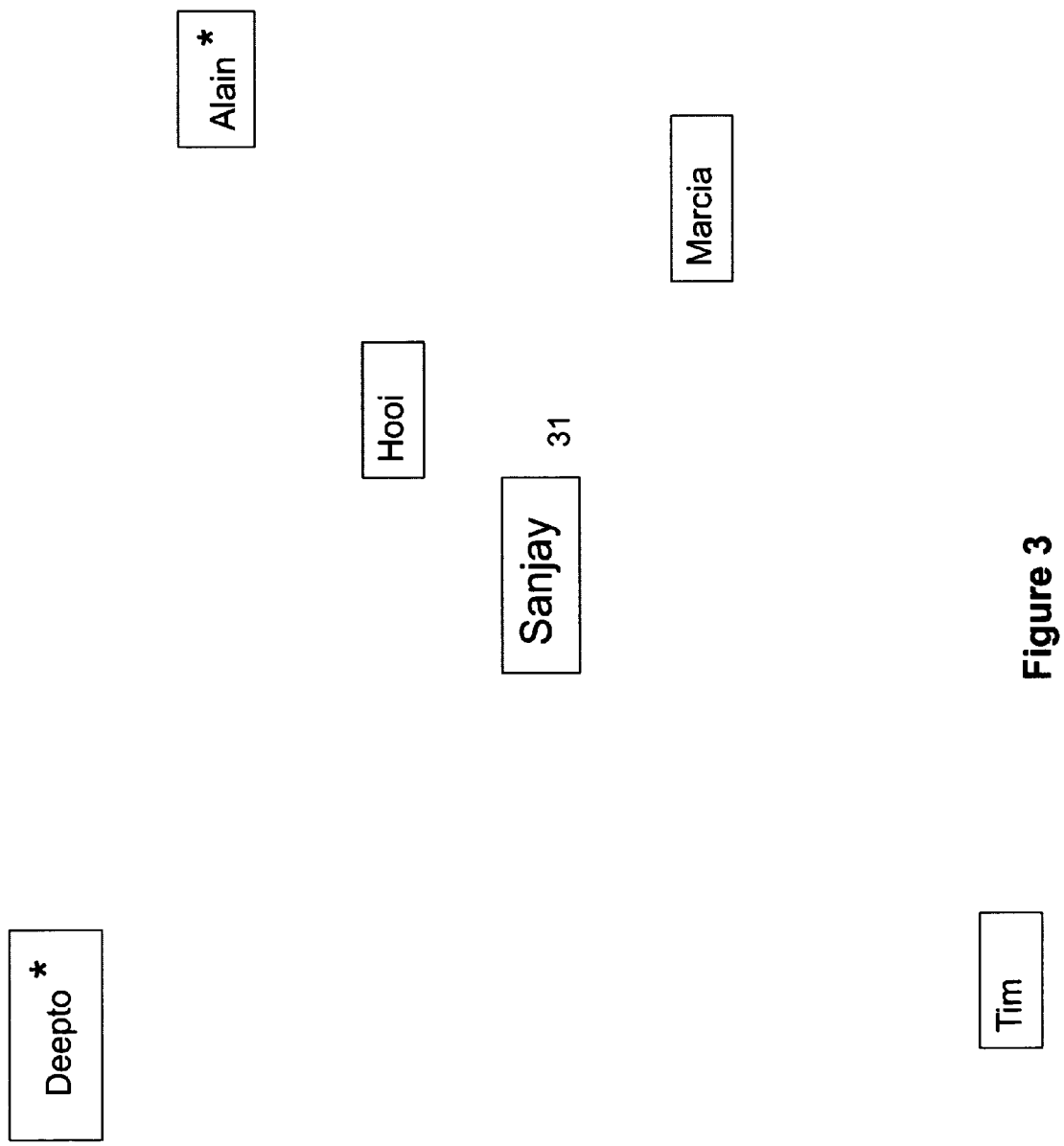
FIG. 3 shows linkets around a user, based on location and not using an ad blocker.

FIG. 3 shows Sanjay 31 on a map of some region around him. Maybe of his city or state. The other people (unlabelled) are those (with their devices) that run linkets in the subject that he is looking for. Hooi and Marcia are closest to him geographically. While Deepto and Tim are the furthest away. The stars next to Alain and Deepto's names indicate that their devices are not running ad blockers. The others have ad blockers. The Registry returns a list of linkets. The first linket is Alain and the second is Deepto. Here, the absence of ad blockers is the main sorting criterion. The second criterion is proximity. So Alain is first because he is closer to Sanjay.

This sorting assumes the Registry returns results in an ordered list. An alternative is for the results to be shown in a graphical format like FIG. 3, where Sanjay can then move over the map to pick one.

For domains, DNS permits a query to be an Internet address, whereupon it will return the name of any associated domain sitting at that address. (A reverse DNS lookup.) Likewise, a program can ask the Registry by sending it a deep link. The Registry can find any linket (or linkets) that is using or has used that deep link. Or a program running on an external device can send the Registry an Internet address. The Registry returns any linkets that are or have used that address in their deep links.

For the latter 2 cases, there could be several linkets associated with a given Internet address or deep link. Imagine that an address is a temporary address handed out by a WiFi or WiMax hot spot. During the previous month, that address might have been part of different deep links (where the app part of the deep links varied). This is possible if different users came by that hot spot and made deep links at different times that by coincidence used the same address. Since the hot spot has often only a small number of addresses, this might happen.

One variant is where the program sends an app id and wants to know the linkets that use this app. Or have used it, since a linket might over time have used different apps.

More broadly, the program can ask, using a range of network addresses. For example, it might ask which linkets use or have used addresses in the range 10.11.12.*, where the star designates any valid integer value under IPv4. Similar examples can be cited for IPv6.

Suppose that Sanjay has gotten Jane's linket by some means, generally not involving the Registry. When he tries to connect to the linket, by his device asking the Registry for the deep link, imagine this happens during the linket's downtime. Maybe he does this on a Saturday, and she does not work on that day. The Registry can send him her timetable of availability, as discussed earlier. It can also offer to give him other linkets and deep links that are available immediately. These other linkets or deep links are or can be by competitors of Jane. The Registry can do this based on what type of service Jane is offering (in this case, ESL).

The Registry can charge those other linket/deep link owners for this service. This is equivalent to the paid ads that often appear in web pages when a user is asking a search engine for some topic. It amounts to contextual advertising, where the context is that Sanjay has indicated that he is interested in ESL.

The program described in this section could be a stand-alone program on Sanjay's device. Like an app. Or it might be part of the operating system of the device. Or it could be a web page accessed via a browser on the device.

The program or the browser needs the ability to show the results as linkets, where these are clickable by Sanjay. Typically, the display of the linkets would show the linket labels, with some indication that these are clickable. Just like links in a web page are shown as clickable in a browser.

If Sanjay picks a linket, the program or browser executes the associated deep link in the manner described in previous submissions. It installs the app in the deep link, if the app does not exist on his device. It starts the app and gives it the address in the deep link.

Suppose Sanjay looks at a screen of a program or browser. Several linkets are depicted in the screen. If he moves his mouse over a linket, the value of the underlying deep link might be shown elsewhere on the program screen, if this is available to the program. Similar to how when using a browser, a user hovers the mouse over a link label. The value of the URL is shown on the bottom of the browser.

If the deep link is not available, the program might take it upon itself to ask the Registry.

Now consider the owner of an app. We mean the person or company who owns the actual app. This entity likely also runs an app server that instances of the app connect to. The app owner can ask the Registry to see the spatial distribution of linket owners who use the app. This can be combined with standard mapping data, like the population distribution. So if the app owner sees few linket owners in a region, it might try various recruiting means to get linket owners for that region. The linket owners can be thought of as franchising the app from the app owner.

In general, the app owner might want to encourage as many linket owners to use its app. The linket owners attract the mass user base of the app. And by the linket owners using whatever means to promote themselves (to grow their paying audience), then the app owner benefits.

When the app owner markets to linket owners, this can be considered a b2b (business to business) effort. Whereas when the linket owners market to end users, this is a b2c (business to customer). The app owner could offer incentives to people to run linkets using the app.

In the above, we largely described uses of the Registry. This deliberately conflates the Registry with a search engine. Namely, a search engine company might see the running of the Registry as a natural extension of its duties.

Suppose a linket is written in various web pages. The linket can be ranked using the rankings of those web pages; an approach pioneered by Google.

3: Verified Linket;

Consider an example where a user Deepto made a linket "FastDriver Deepto top dog" for a game app FastDriver. The linket suggests that he is a top player. Per se, this is unverified. There is a business opportunity for the owner of a trademark (here "FastDriver") or app to verify or credential in some way linkets that use its trademark or app. The Registry or the owner could charge Deepto for this. The credential says that Deepto is a "top player" for the game. Where the phrase might be defined by the owner of the game or by some game industry association.

The value of this can be that the Registry could indicate which linket results are verified. It could return verified results first in response to a search.

4: Rating a Linket;

An organisation could amass ratings of linkets. There could be several competing groups that do this. One candidate is the Registry itself.

The reason to rate could be as for the Web. To let users who see a linket in their browsers or apps decide whether to pick the linket or not.

A user who picks a linket might be able to rate the linket via graphical means offered by the browser web page or app in which the linket appeared.

When we say rating, this can be a number from 1 to 5, where 1 means lowest and 5 means highest or best. Similar to how items are rated on Amazon, for example. And, like Amazon, a user might be able to write a review of the linket. For simplicity, when we now say a 'rating' of a linket, this might also include the possibility of reviews of that linket.

We described a linket as ultimately resolving down to an app running at a network address. There are currently many reviews of (mobile) apps. And, when a network address maps stably to a domain, there are reviews of domains/websites. But a rating of a linket is a rating of a combination of app and the owner of the linket. The linket rating is not in general a rating of the network address, because that can and will be expected to be transient.

If a linket maps in time or space to other linkets or deep links, then the rating of a linket might be derived in part or entirely from the ratings of the latter. Note that the use of ratings of the latter does not require that all those linkets or deep links have ratings. There could be a policy to handle cases of a linket or deep link not having a rating.

Suppose Jane has a linket with some rating, based on her past activity. She runs an auction to sell space and time slots as described in submission 14. Winners are found, and some (preferably most or all) have ratings. When someone sees her linket rating via a browser or app, the rating might be composed thus. Her rating is shown, based on feedback prior to her auction. But there is also the set of ratings of the winners of the auction. This set might be summarised by some number, which could be the median or mean rating of those winners. The user could click on this rating to see the underlying ratings that went into it.

We said "based on 'her' past activity". "Her" could mean mostly or entirely based on the ratings of winners of some or all of her past auctions. She could or could not actually have serviced some of the slots herself.

The rating of her linket can be based on all previous events (auctions). Or on the last 6 months or year. The GUI that a user uses to see her rating can have options to see how the rating varies as the function of this temporal window.

The time intervals of this temporal window need not be associated with the time slots of the linket. Earlier, we described an example where Jane auctions time slots in a given month. Suppose she does this each month. The temporal window for ratings could have time intervals of 1 month, 6 months, 1 year, 2 years and so on. The time intervals for seeing rating values would in general be used for any linket. And other linkets might not have monthly events like her linket.

Having said this, there might be a programmatic way (via an API for example) for the program that shows the rating history to detect that a given linket has events each month. The program then customised the time intervals to be monthly. So the user can see the rating change for 1 month back, 2 months back, 3 months back etc.

Suppose a linket maps to other linkets or deep links using spatial slots. As in the previous paragraph. The web page or app that shows the ratings history can show this also as a function of region. So if Jane's linket maps to North America, South America, Europe/Africa and Asia, the user can see the history of ratings of responders from those regions. Perhaps the responders for North America got lousy ratings, but the responders from South America got excellent ratings.

Ebay successfully introduced into the Internet the idea of sellers and buyers in an auction rating each other. In this submission, the responders who handle a given slot might be able to rate their customers, similarly to how their customers might be able to rate them.

Above, we said auctions. This can be generalised to other events or activity of a linket.

5: Blockchain;

We extend the discussion of submission 12, "Blockchain and deep links for mobile apps".

Figure 4:
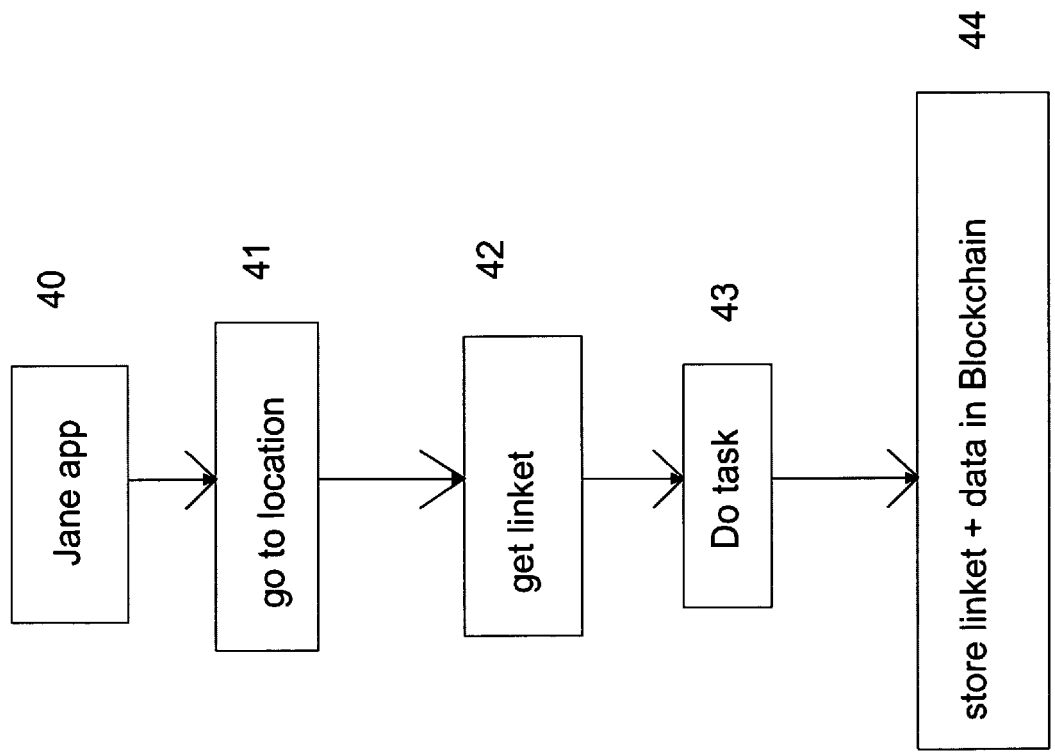
FIG. 4 shows writing a linket to a blockchain.

Consider FIG. 4. It is derived from FIG. 1 of submission 12. Item 40 is Jane and her app (running on her mobile device). She goes to some physical location 41. There she gets a linket by various means in step 42. The linket might be printed on a poster, and she scans it with her phone, where Optical Character Recognition is used to convert it to text, which is then interpreted as a linket. Or the linket might be shown as a barcode, on hardcopy or on an electronic screen. She scans it with her phone, which decodes it to the linket. Her phone contacts the Registry and gets the current deep link. It installs the app that is defined in the deep link (if the app does not already exist on her device). The app is run.

Note that here, the deep link does not necessarily have the address of another program on the network, with which her app instance will interact.

She then does some task with the app, as step 43. Upon completion, the app or the app server writes a record of her task completion to the blockchain in step 44. The record might involve writing the linket. Possibly, the deep link that was used might also be written. If the task is only partially completed, possibly as defined by some set time interval, then the partial completion could be written in a similar way to the blockchain. Perhaps with some data that indicates the amount of completion.

The data recorded to the blockchain could also have the coordinates of her physical location.

Figure 5:
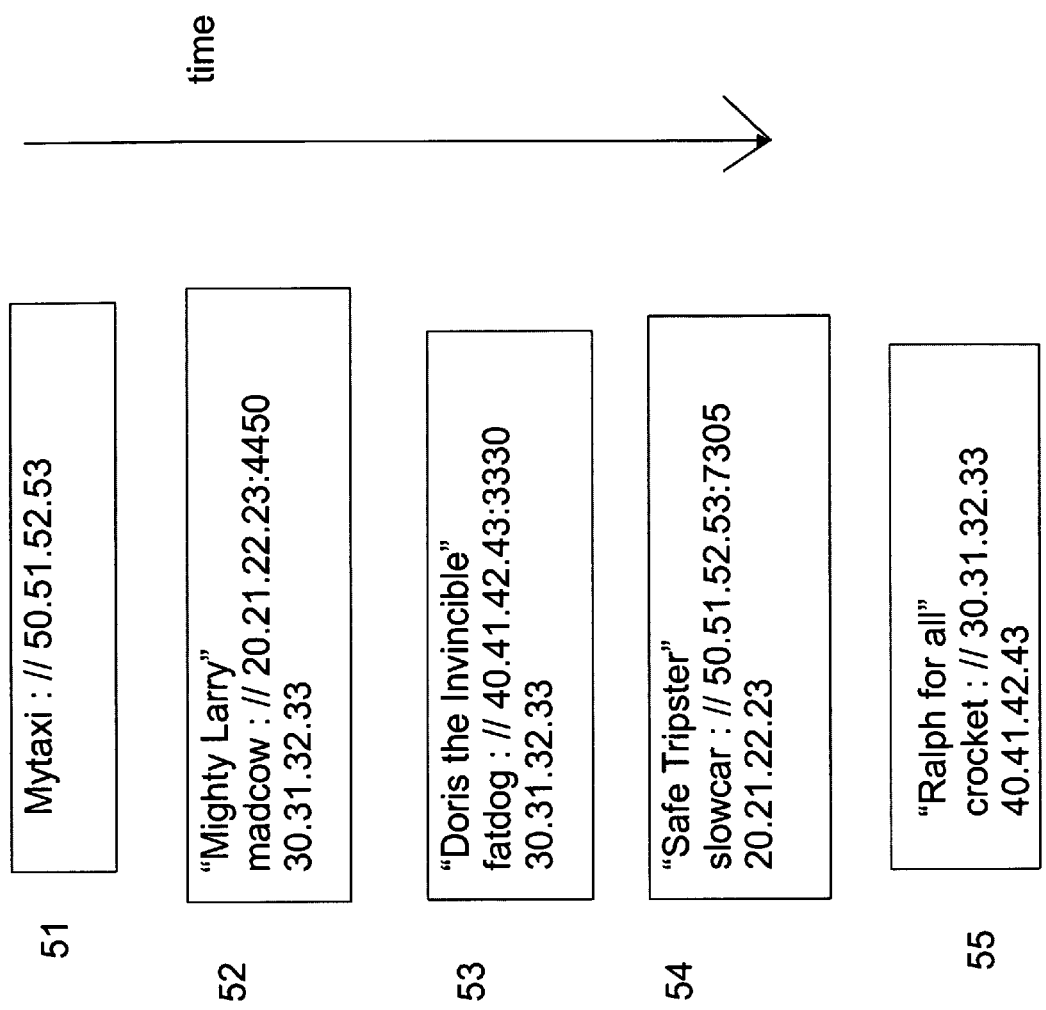
FIG. 5 shows a blockchain with linkets.

FIG. 5 is derived from FIG. 2 of submission 12. FIG. 5 shows a blockchain containing linkets. The arrow indicates that time increases from top to bottom. Entry 51 shows a deep link "mytaxi://", where the affiliated data is 50.51.52.53. This means that the latter is the address of the device that ran the app mytaxi. The latter could be a single user app, that does not interact directly with any other app, or with any other instance of mytaxi. This instance will typically interact with its server. For simplicity, we will refer to the device as "50".

Entry 52 shows a linket, "Mighty Larry". It maps to a deep link of a game app, "madcow://20.21.22.23:4450" which was run by the device at address 30.31.32.33. We refer to this device as "30". The entry means that the app madcow has an instance at 20.21.22.23, and this instance is listening at port 4450. We refer to the device at 20.21.22.23 as "20" or Larry. Device 30 ran an instance of madcow which then communicated with Larry.

Entry 53 shows a linket, "Doris the Invincible". She has her deep link "fatdog://40.41.42.43:3330" run by the device at 30.31.32.33. The latter is "30", as in entry 22. We refer to the device at 40.41.42.43 as "40" or just "Doris". Doris listens at port 3330. The entry says that 30 interacted with Doris.

Entry 54 shows a linket, "Safe Tripster", with the deep link "slowcar://50.51.52.53:7305" run by the device at 20.21.22.23. The latter is device 20, as defined earlier. The device at 50.51.52.53 is device 50, as defined earlier. But we might just say Tripster. The entry says Tripster was running an instance of slowcar, listening at port 7305. And the instance of slowcar run by device 20 interacted with the instance run by Tripster.

Entry 55 shows a linket, "Ralph for all", with the deep link "crocket://30.31.32.33" run by device 40.41.42.43. The latter is device 40, as defined earlier. The device at 30.31.32.33 is device 30, as defined earlier. But now, given that we can associate a linket with device 30, instead of saying "device 30", we might say the linket. Entry 55 omits the port in the deep link, compared to entries 52, 53 and 54. In part, a point of entry 55 is that a deep link can omit the port. Possibly if a default port is defined for a given app, so that it can be omitted for brevity in any logging.

In the above, we deliberately tried to use the linket as a representation of the associated deep link. In part because the linket might have more understandable meaning, compared to the raw address of a deep link. This of course is the very point of having a linket.

Another remark about the figure is due. It depicts the linkets in the blockchain as text delimited by quotes. As per the discussion in the previous section, the particular choice of a linket format would influence exactly how the linket is stored in the blockchain. We chose the representation convention of the quotes to signify that the discussion here is independent of the format choice.

Figure 6:
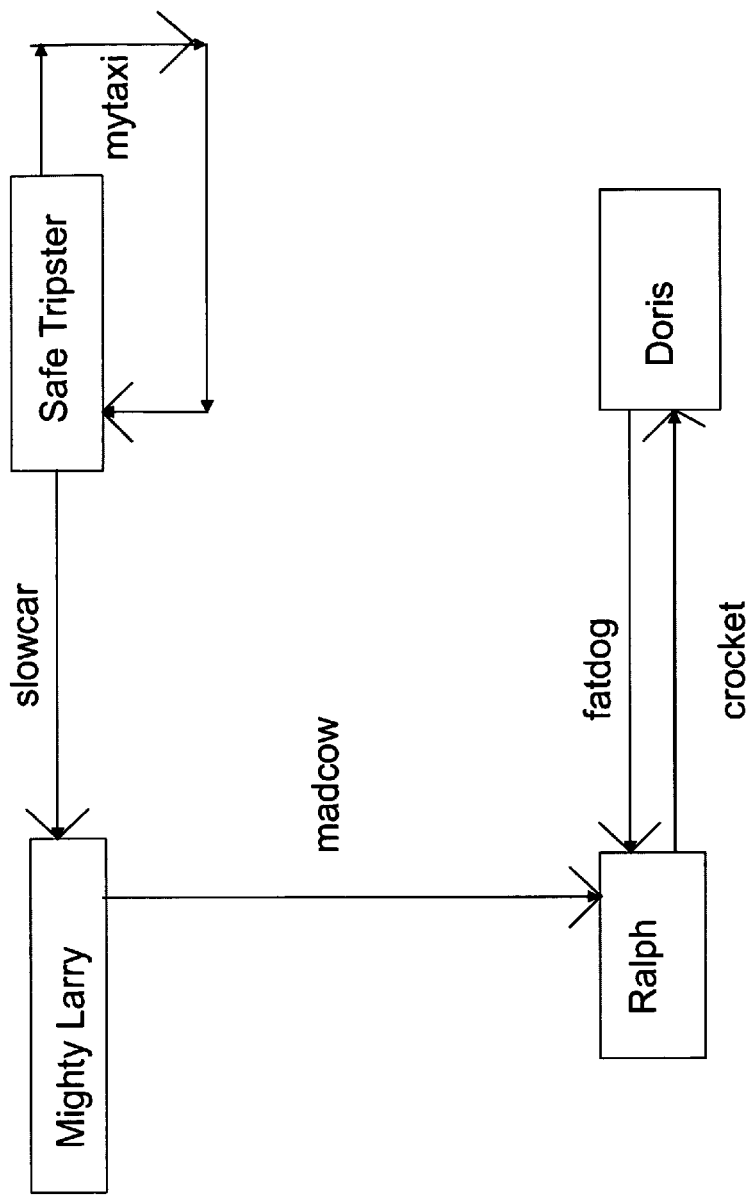
FIG. 6 shows a social network graph derived from FIG. 5.

FIG. 6 shows a social network graph derived from FIG. 5. The linket labels are used as names of the nodes of the graph. This can be more meaningful than using the network addresses associated with those linkets. Especially since the addresses can change over time.

Another vantage is to use the perspective of relational databases, and to regard the linkets as the primary keys into tables.

Thus if a blockchain archives the past interactions of linkets, analysis engines can run against the blockchain to derive a social network graph.

A blockchain might also be used to schedule future events. We extend Section 3 ("Blockchain for future events") of submission 12. That section described writing deep links with arguments that are the start and end times of future interactions, to the blockchain. However, instead of writing a deep link, a linket could be written, with extra associated arguments that are these start and end times. Possibly also location information can be added. This can be the location (perhaps given as a geofence) of the user who will interact with the linket in that time interval. These extra arguments might or might not be part of the linket. If not, they might be associated, perhaps via writing the linket and the arguments in XML notation.

Another advantage of writing a linket instead of a deep link for future events is that this gives flexibility to the linket owner. She can subcontract the task to another person, for that time interval, similar to the manner described for auctions in earlier sections.

In Section 7 of submission 12, we discussed the signing of a deep link entry in the blockchain. Now, if a linket and any associated data are written to the blockchain, so too might be a signature of the linket and zero or more fields of the data.

Section 10 of submission 12 discussed where a deep link pointed to a blockchain. The example was used of a deep link like "bchain5://", where bchain5 is the name or id of a given blockchain. And where there could be other data after the "://", like the address or domain of the blockchain. Now, the blockchain might own the linket "Blockchain 5", which could point to the deep link. Given that the blockchain is likely represented by several (many) computers at different locations, the blockchain might tell the Registry to map the linket to a given deep link that is a function of the location of the querying device.

Or, the top level linket for the blockchain could map to linkets or deep links for different regions that the querying device is in. Thus the blockchain organisation can delegate or subcontract to different regional groups.

6: Capacity and failBits;
6.1: Capacity;

Jane has a linket and schedules a future event. Before the event happens, she finds Ralph who is willing to be the person (with a device) that will run the app behind the linket at that time. She tells the Registry that for her linket, at that time interval, to map it to Ralph's deep link or linket.

But she also finds Denise as a second person (with a device). Denise acts as an overflow or backup or fail over person. Jane tells the Registry to map Jane's linket to Denise's deep link or linket at that time interval, after Ralph. So if the Registry gets a second request during the time interval, the Registry will return Denise's deep link or linket to the questioner.

The time interval of the event happens. Someone else, Roger, uses the blockchain to find the event about the linket. He interacts with the linket, which delegates the task to Ralph. Now suppose Priyanka scans the blockchain, during this time interval. She does not know Roger. She is at a different location from him, in general. She sees Jane's linket in the blockchain and is interested in interacting. She picks the linket from the blockchain. She sends the linket to the Registry. It returns Denise's deep link or linket. Priyanka and Denise then interact via their devices and apps.

In this interaction the blockchain was used. Because entries in the blockchain are persistent. But the above scenario could happen without any blockchain. Roger and Priyanka could avoid the blockchain by dealing with the Registry. Or, imagine that Jane's linket was shown in a web page. And independently of each other, Roger and Priyanka went to that page during the time interval, using the browser on their mobile devices. And Roger clicked on the linket on his page. Soon after, Priyanka did likewise on the linket in her copy of the page.

The key feature is that the linket owner (Jane) can send 2 (or more) deep links or linkets to the Registry. Telling the Registry to map Jane's linket to those, in the order she designated, for the first and for the second queries to the Registry with her linket.

A variant is that for each deep link or linket Jane sends to the Registry, she also sends a number which is the capacity. So if the number for Ralph's linket is 5, this means the first 5 queries with Jane's linket are delegated to his linket. And if the number for Denise's linket is 8, then the next 8 queries with Jane's linket are delegated to Denise's linket.

Figure 7:
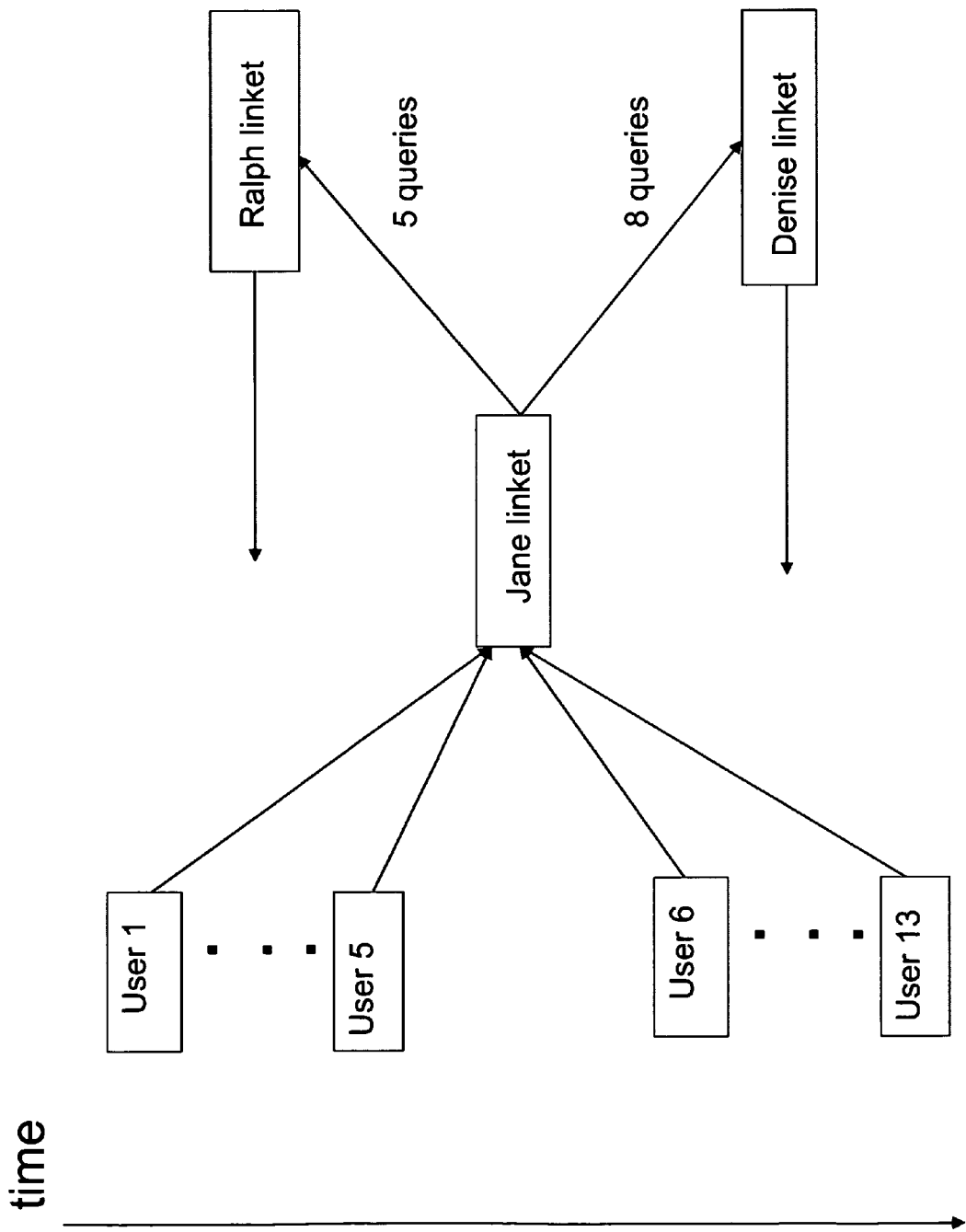
FIG. 7 shows a linket redirecting to 2 linkets based on the number of queries.

See FIG. 7. Time increases from top to bottom. The first 5 users (User 1 to User 5) use the Registry to send queries to Jane's linket. The Registry redirects these to Ralph's linket (or deep link). The arrow leaving the Ralph linket item points back to User 1 to User 5, to indicate that Ralph's device will respond to these users and their devices. But for the next 8 users (User 6 to User 13), when they access Jane's linket, the Registry redirects to Denise's linket.

This depends on the type of interaction expected or implied by Jane's linket. But Ralph might have the capacity to handle up to 5 queries. And so on.

What could a use case be? Suppose Jane's linket is for some instructional app. An instructor might be able to handle up to some maximum number of concurrent students. Perhaps Ralph's device and his bandwidth up and down to the network determines his limit of 5 students. While Denise has a device with more memory and bandwidth and can take 8 students.

Another case could be where the app is a 2 player game. The first person to join up with Ralph plays him. While up to 4 others can watch the game.

Separate from any use of a blockchain, a user with a linket could sign up for time slots with other linkets. See FIG. 8. Graham has a linket (or a deep link). In a given week, he had bid for and gotten time slots from 3 other linkets. From Jane linket, for Wednesday 8 a-3 p. From Rahul linket, for Friday 8 a-1 p. From Andre linket, for Monday 1 p-8 p. All times are relative to one time zone, which might be Graham's time zone. We can imagine here that the linkets for Jane, Rahul and Andre are all for teaching one topic, for example. Or for playing one game.

Figure 8:
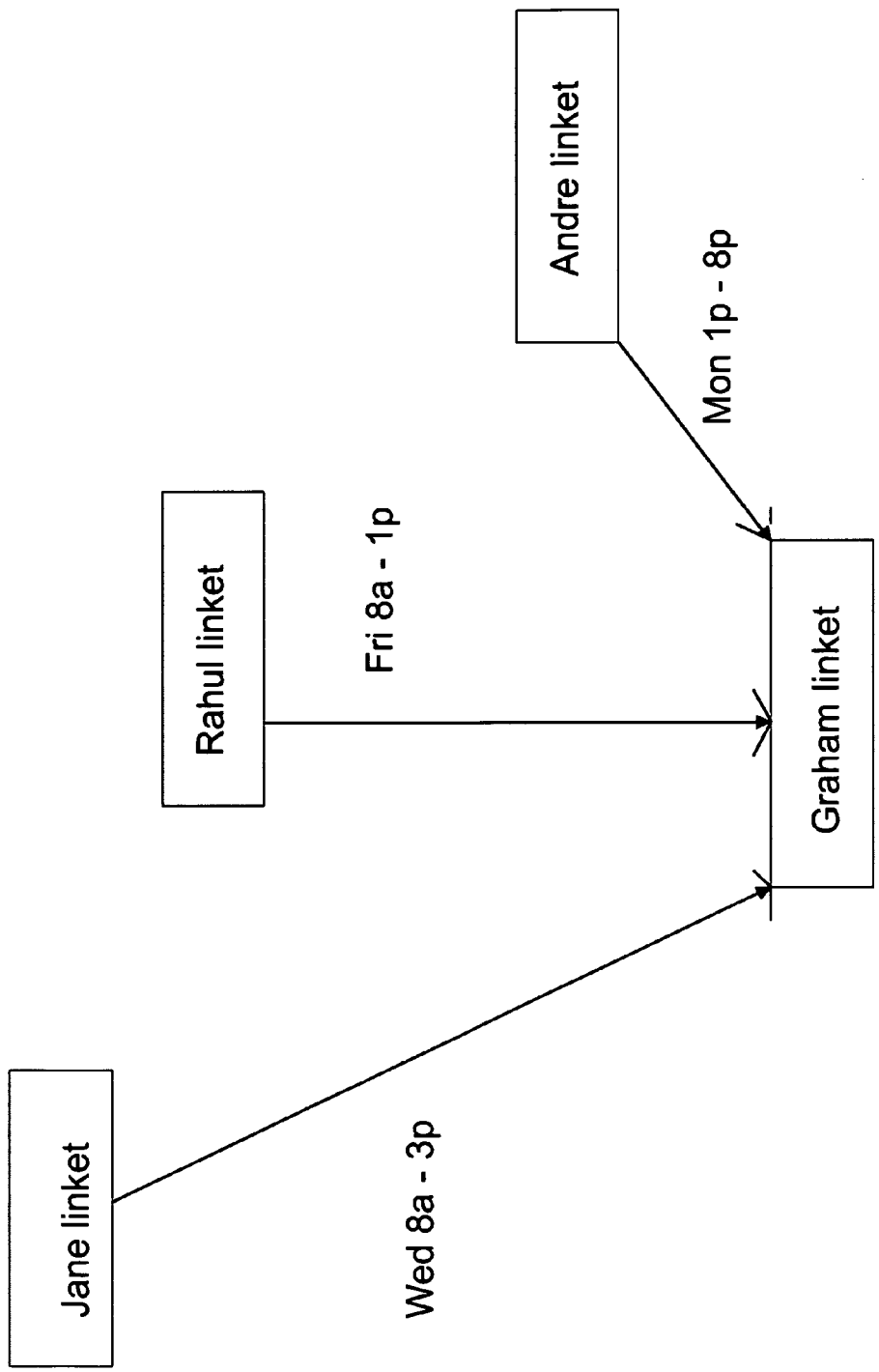
FIG. 8 shows a linket getting time slots from 3 other linkets.

FIG. 8 may be considered as given from the perspective of a destination linket. While the earlier discussions were from the perspective of a source linket, that auctioned off its time slots.

FIG. 8 depicted Graham as getting ("winning") time slots from independent linkets. In general, those linket owners will have no knowledge that Graham bidded for slots from each of them. It is Graham's responsibility to ensure that he does not bid and win overlapping slots. Or that if he does, he can fulfill his answering of the services implicit in overlapping slots.

Figure 9:
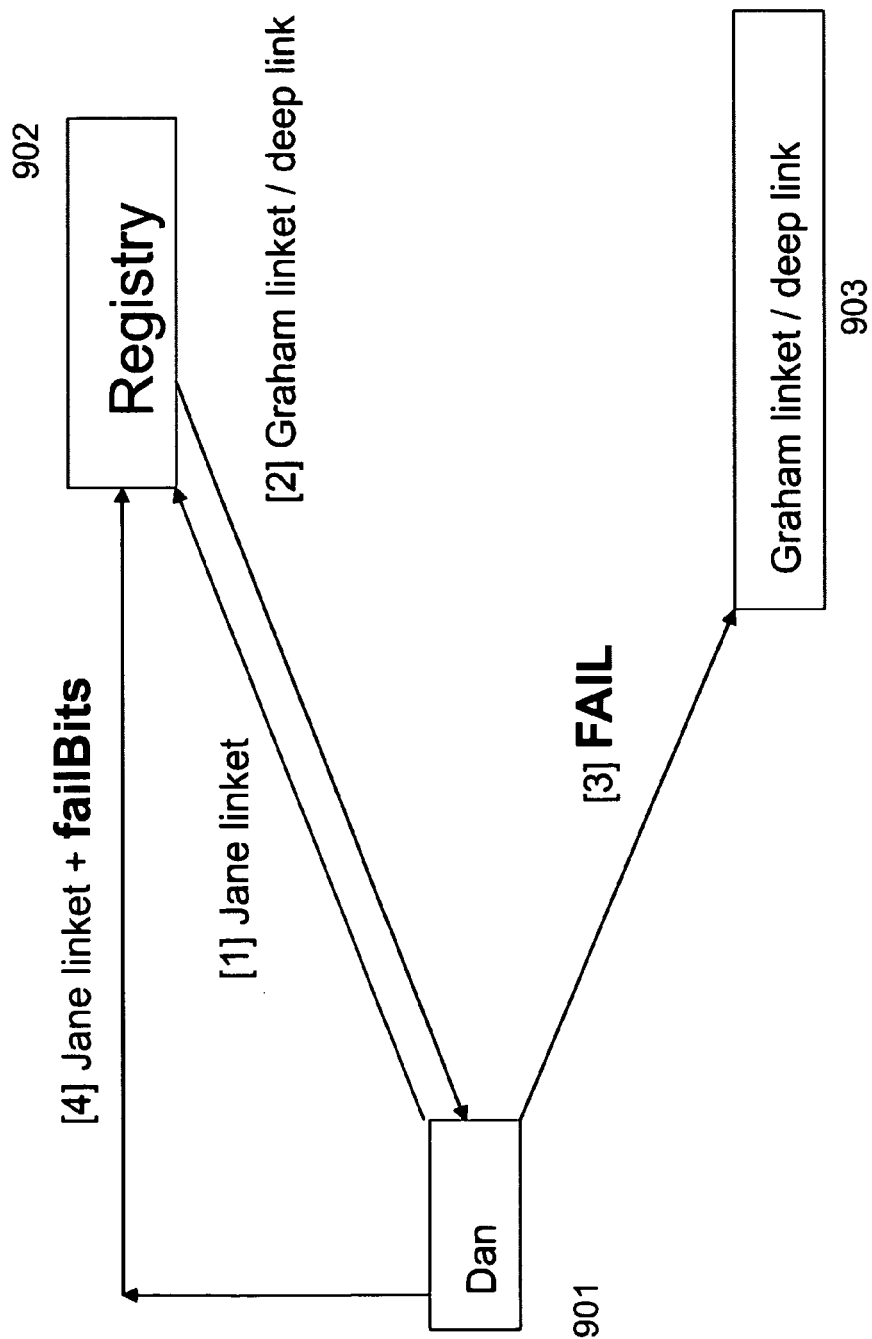
FIG. 9 shows how to handle a deep link not responding.

6.2: FailBits;

Now suppose we have the following error condition. Hopefully rare, but it can and likely will still happen. See FIG. 9. There is a user Dan 901, with his mobile device. He gets Jane's linket by some means and he wants to interact with it. His device sends it to Registry 902, in step [1]. Jane at some earlier time has auctioned off the current time slot to Graham's linket, and had told this to the Registry. Thus in step [2], the Registry replies to Dan by sending him Graham's deep link. The Registry has mapped from Jane linket to Graham linket and then to a deep link for the latter.

Dan's device then tries to connect to Graham's deep link in step [3]. Here, we omitted a likely case where Dan's device between step [2] and [3] did an install of the app in the deep link if his device did not already have that app.

Now suppose Dan's device gets no reply from Graham's deep link. For whatever reason, Graham is out of touch. Dan's device (or more specifically perhaps, the app on his device that tried to contact Graham) can do the following. It can resend the original query of Jane's linket to the Registry. But in this message, it can add a "failBits". This can be a single bit or set of bits. To tell the Registry that Graham's deep link failed. The combination of Jane linket and the failBits is item [4] in the Figure.

If Jane had earlier defined a failover linket or deep link, then the Registry detects the failBits and replies to Dan with the failover linket or deep link. This can be run by another person, or by Jane herself. Separate from this, when Jane originally registered her linket with the Registry, she could also have told it an electronic address of hers. The Registry can now send a message to that address, telling that Graham's deep link does not respond. The steps in this paragraph amount to extra steps that are not depicted in FIG. 9 for clarity in the latter.

If the failBits is a set of bits, this set might have some diagnostics found by Dan's device. Like an estimate of how long his device tried to contact the deep link. So the Registry can send the failBits to Jane's address. Perhaps to aid her diagnostics. Jane can use the failBits to decide in future whether to keep referring to that failed linket in other time slots.

One refinement is that when the Registry gets item [4], before it contacts Jane, it might try to contact the deep link that it sent to Dan. To get extra diagnostics, which can then also be sent to Jane. The Registry might do some network analysis. In part because it can be expected to have rules encoded for this analysis. Whereas an arbitrary Jane who has the top level linket will not have this expertise.

Another reason is that the Registry can try to guard against a Dan who is an attacker. He is deliberately sending false information to the Registry. Perhaps to try to corrupt its database or the database or actions of the linket owners like Jane.

The above assumed Graham's linket mapped to a deep link of his. But if his linket pointed to another linket (of someone else), then the above narrative can be extended to handle this extra indirection. The basic mechanism is still the same. A failBits is defined and sent to the Registry. Letting the latter reply with an alternative deep link and possibly telling the parent linket that it is pointing to a linket or deep link that is unresponsive.

One case is where suppose Graham had won two non-overlapping time slots from Jane. During the earlier one, his deep link did not respond. Jane might now tell the Registry not to use Graham's linket or deep link for his later time slot.

A related possibility is where the Registry by default will do this. Since it has the time slot winners for Jane's linket. She would send these to the Registry in some timely manner—hopefully well in advance of the time slots. The Registry can do one of two things. It might immediately remove Graham's linket from the later time slot, and replace it with a backup linket if Jane has provided that. Or it might wait till some time soon before the start of the second time slot for Graham. Then the Registry can ping or otherwise make some type of contact to Graham's deep link. If the deep link is unresponsive, then the Registry maps to a backup linket if the latter exists.

7: Person to Machine (p2m) Interaction;

Thus far the use cases we cited have been for a person to person (p2p) interaction using linkets. Where once the linket has been resolved, the interaction has involved two or more people interacting via their (mobile) devices. We include in this the case where one person is playing a one person game (or activity) on her device, and where others are watching that on their devices. This was implemented typically by the first person promulgating a linket pointing to her app on her device. The spectators could be near her or remote (in another town or country).

Another possibility is a person to machine (p2m) interaction. A use case is automated testing where in this context we mean the testing of humans. The reader is familiar with tests where the questions might be multiple choice. The user has to pick one or more correct answers.

The checking of the answers can be automated, which is a major attraction of multiple choice exams.

A different example relates to the case of teaching ESL. An automated question might involve the question being shown as text or spoken. The user has to reply by speaking a given word or phrase. Or she has to say something whose contents are not supplied in the question. Her device records this and sends it over the network to the server. The latter uses an Automatic Speech Recogniser (ASR) to convert this to some text form and compare to the answer.

The system can be configured as follows. A server is on the network. It might be in a fixed location. While the server could still be a mobile device, this is not a requirement. The server makes and promulgates a linket pointing to a program listening at a port at the network address of the server. Jane gets the linket and wants to take the test. Her device runs the linket to download (if necessary) the app defined in the linket. Note that there is no requirement that this app be the same as the server's program that the app connects to. When the app runs, Jane works her way through various questions. All are characterised by the answers being able to be evaluated on the server in a programmatic way. This lets the testing be economically scaled to essentially handle an arbitrary number of test takers.

A minor variant is where the ASR sits on Jane's device. Another variant is where the ASR sits on a third device. Jane's spoken input might be sent by her app to that device, where the output comes back to her app, which then forwards it to the test server. Or where the ASR has been instructed to forward the result to the server.

Figure 10:
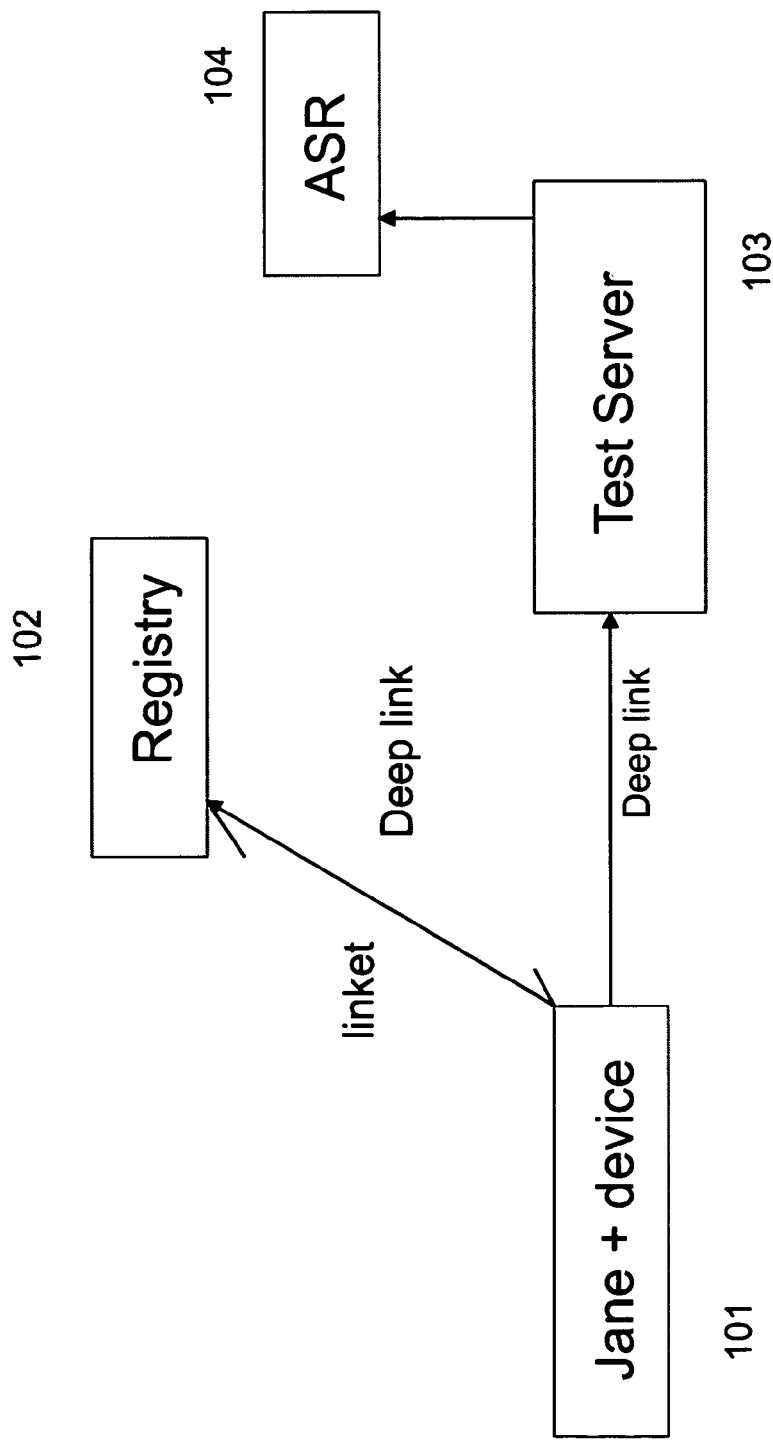
FIG. 10 shows a user interacting with a test server.

FIG. 10 shows Jane and her device as item 101. Her device sends the linket to Registry 102, which returns a deep link. Her device uses this to contact Test Server 103. The latter avails itself of an ASR 104. The ASR is depicted as external to the Test Server, as one possible configuration. More generally, the ASR can be considered a proxy for other complex functionality that could be inside or outside the Test Server.

The condition that all the answers can be machine evaluated can be relaxed. A test might have some questions where either as part of the normal evaluation or as exception processing, a human is used by the server to manually evaluate an answer. This does require a person on the server side, but by having most questions answered by machine, there can still be considerable scaling benefits.

8: Automated Deinstalling of Linket Apps;

With mobile devices a persistent problem has been the need to periodically remove apps that are no longer needed. Perhaps the memory is getting full, and if Jane wants to install another app she has to free up space. Another reason might be the lack of space on the device screen. Each app is often represented by an icon. She might feel that the screen is getting too cluttered.

Consider this scenario. Roger used the linket "Easy ESL" to install app Alpha on his device on 2 March. He uses the app to learn English over the next few weeks by interacting with Jane, the instructor. During the use (perhaps in the install steps), she asked for his email address. On 17 April, he gets an email saying that she is migrating her linket from Alpha to Beta. Beta might be a completely different app or an upgrade of Alpha (e.g. Beta=Alpha version 2). Her future teaching will only be on Beta. The email helpfully includes her linket. By assumption, Roger is reading the email in his browser. The browser has been modified so that it recognises the linket as a clickable link, just like an URL. Roger clicks it and the browser, in tandem with the operating system, contacts the Registry to get the deep link and to install Beta. In all likelihood, this was the same means by which he first used the linket on 2 March.

Beta is installed. Alpha is now obsolete on his device. He can manually deinstall it. But he might forget or not care. In either case, this adds an unnecessary burden on him and on the device. One answer to this is the following.

See FIG. 11. His device operating system keeps Table 1. It lists the apps installed via linkets. The first column is the linket. The second column is the app id. The third column is the date of installation. There might be more columns of other data.

In earlier sections, we described how the device operating system might be altered for easy execution of a linket to install and run an app. During this, Table 1 can be written to. And separate from this, a (mobile) device likely already has a table of installed apps with columns 2 and 3. It is a short distance to alter the existing table to add a linket column. Also, Table 1 is small, compared to the memories of current devices. Any incremental storage burden is negligible.

So on 17 April, Beta was installed and line 2 added to Table 1. The device then compares the linket entry for 17 April to any other earlier entries for the same linket. Here, "same" means comparing the label of the linket, and not the deep links that the linket maps to. The device sees that on 2 March, the same linket caused the install of Alpha. Which is now (on 17 April) not pointed to by any linket.

The device can do one of two things. It can automatically delete Alpha, and perhaps send a message to Roger afterwards. Or it can first send a message to Roger, maybe via a popup dialog. Asking for example, "App Alpha is no longer used. Can I delete it? [Yes/No]". The Yes and No indicate that the dialog might have 2 buttons, and Roger picks one. This does involve a simple manual step. But by bringing the issue explicitly to his attention, the device performs a useful service to him. Even if he decides not to delete Alpha at this time.

The above described the device first installing the new app Beta and then finding that Alpha is no longer needed. The order of these can be reversed in some cases. Imagine that before installing Beta, the device can get an estimate of Beta's size from the app store or app server. The device can see if there is enough free space to install Beta. If not, the device can see if Alpha is no longer needed. In this case, it can delete Alpha or ask Roger if it can delete Alpha. This deletion, if it goes ahead, might free up enough space to install Beta.

A refinement is where the device gets the size of Beta from an external source, and it knows the size of the installed Alpha. It calculates new free space=old free space+size (Alpha). If new free space<size (Beta) then Beta cannot be installed even if Alpha is deleted first. The device can send a message to Roger, offering any possible actions he might want it to do.

Table 1 offers other useful possibilities. Periodically, the device can use it to poll the Registry with the linkets in the table. If a given linket now refers to an app different from the app installed on the device, then the latter is outdated. There can be an option for the device to automatically install the latest apps and perhaps also de-install the outdated apps.

One advantage is that this does not rely on the linket owner telling the device owner that the linket now points to another app.

Another possibility is when space is low. The device can use the table to find any outdated apps (outdated as being defined via the linkets) by asking the Registry about the apps. It tells Roger these, probably along with the sizes of each and with the total size. He can manually pick which ones to delete, or to delete all of them. Here, there case can be that for a linket, there are 2 or more apps, and only one of these is the current app, like the example in FIG. 11.

Figure 12:
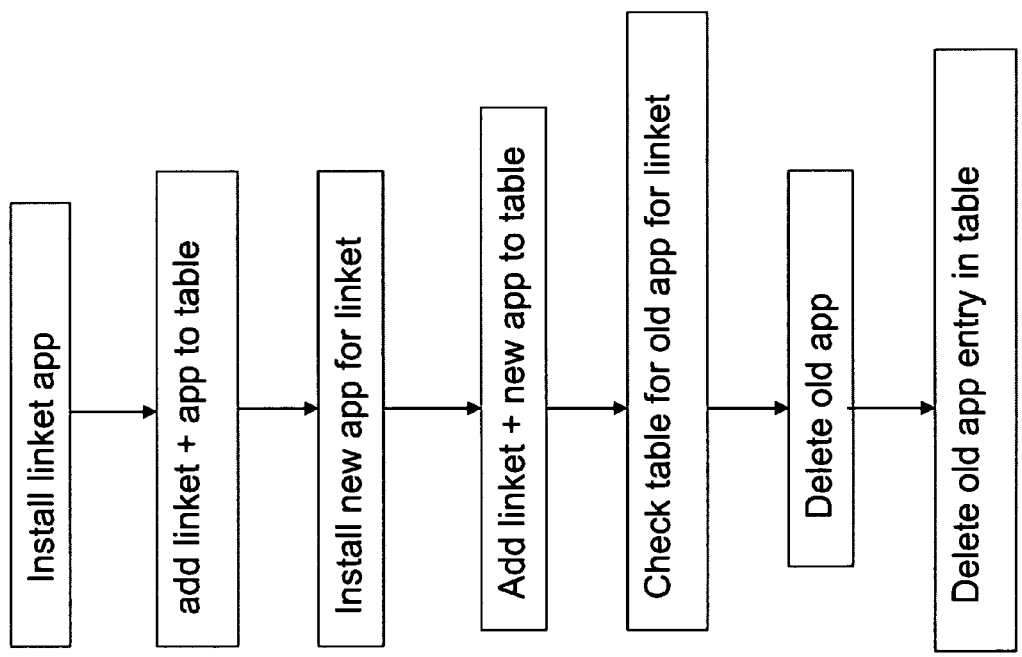
FIG. 12 is a flow chart of deleting an obsolete app on the device.

The overall above steps involving Table 1 are shown in a flow chart in FIG. 12. The logic starts at the top. For brevity, we omitted numeric labels on the boxes in the chart. The contents of the boxes read in tandem with this discussion should make the chart understandable. All the steps in FIG. 12 happen on the (mobile) device.

For brevity, FIG. 12 omits the steps in the text about the device asking the user whether to delete an old app. And other more involved steps about calculating memory. Though those steps are not that intricate. The reader can easily alter FIG. 12 to add these steps.

There is a situation involving FIG. 11 which was omitted above for simplicity. Imagine an app that teaches ESL. It is popular, so many ESL teachers use it, and each has her own linket (her professional brand) that points to it. Roger is taking lessons from Jane, as above, and from Linda. See Table 2 and line 2. It says that on 4 March, the linket "Linda's ESL" was picked (by Roger). During installation, the device found from the Registry that this pointed to app Alpha, which was already installed. So the device did not reinstall it. But the device still made line 2 in the table.

On 17 April, Jane tells him that she is migrating to app Beta. But Linda sends him no such message. She is staying with Alpha. The device as earlier with Jane's linket, sees that a new app, Beta, is to be installed. It checks Jane's linket in Table 2 and sees that it points to an installed app, Alpha. But it also sees that Alpha is pointed to by another linket. So the device does not delete Alpha. It does not pop up a dialog to ask Roger if it can delete Alpha.

Now suppose in May, Linda tells Roger that her linket refers to app Gamma. From the above steps, the device sees that Alpha is no longer linked to by any linket, so it deletes Alpha or asks Roger if it is ok to delete Alpha.

A key idea in this section is that for optimising memory use on the mobile device, the device uses time varying information on a second device (Registry) that is different from the first device.

I claim:

1. A system of a first mobile device, Alpha, a second mobile device, Beta, and a server, Registry; Alpha uploading a label and an app identifier to the Registry; the Registry associating the label with a deep link; the deep link having the app identifier and a network address, with an optional port number, of an app instance; the app instance running on Alpha; Alpha uploading one or more images, audios or videos to the Registry; the Registry associating the images, audios and videos with the label; Alpha promulgating the label to social media; Beta obtaining the label from social media; Beta sends the label to the Registry; the Registry returns the deep link; Beta installs the app if the app does not exist on Beta; Beta runs an instance of the app with an input of the network address in the deep link; the instance on Beta interacting with the instance on Alpha.

2. The system of claim 1, where the Registry sends Beta an image, audio or video associated with the label.

3. The system of claim 1, where Alpha associates a region with an image, audio or video;
the Registry uses the network address in the deep link to derive a location for Alpha;
the Registry finds the location to be in the region; the Registry sends Beta an image, audio or video associated with the region.

4. The system of claim 1, where Alpha associates a region with an image, audio or video; the Registry uses the network address of Beta to derive a location; the Registry finds the location to be in the region; the Registry sends Beta an image, audio or video associated with the region.

5. The system of claim 1, where a device uploads the device location and a subject name to the Registry; the Registry returning a list of labels for the subject; the list being sorted by proximity between the device location and a location derived from a network address in a deep link pointed to by a label.

6. The system of claim 1, where a device sends the Registry a network address; the Registry returns a list of labels or deep links that refer to the network address.

7. The system of claim 1, where a label contains a trademark; where a trademark owner authorises a use of the trademark to the Registry; where the Registry sends the label in response to a query from a device; where the response includes a status indicator of the label; where the status indicator denotes that the label is authorised.

8. The system of claim 1, where the Registry sends a message to Beta; Beta rates the label in a reply; the reply is sent to the Registry; the Registry uses the rating to compute an overall rating of the label.

9. The system of claim 8, where the label refers to secondary-labels at different times via a timetable; the rating of the label uses the ratings of the secondary labels.

10. The system of claim 1, with a blockchain and an app server; the app instances on Alpha and Beta interacting with the app server and directly with each other; the label being sent to the app server by one or both app instances; the app server writing a record to the blockchain; the record including the label and a network address of Beta.

11. The system of claim 10, the record including a location of Alpha and a location of Beta.

12. The system of claim 11, where the location of Alpha is derived from the network address in the deep link.

13. The system of claim 10, with a device extracting label data from the blockchain; the device making a social network graph of labels and associated deep links and device locations.

14. The system of claim 1, where Alpha submits for a given time slot to the Registry, a label Psi, a positive integer J, a label Chi and a positive integer K; during the time slot, the first J queries with the label cause the Registry to reply with a deep link corresponding to Psi, the next K queries with the label cause the Registry to reply with a deep link corresponding to Chi.

15. The system of claim 1, where Alpha sends to the Registry a failover label or deep link referring to an instance of the app running on another device Phi; where Alpha does not respond to a network query from Beta; Beta resends the label to the Registry, with one or more bits designating a failure of Alpha to respond; the Registry replying with the failover label or deep link; Beta interacting with the instance on Phi.

16. The system of claim 15, where the owner of Alpha registers an electronic address with the Registry; the Registry sends a message to the electronic address with data about the failure of Alpha to respond.

17. The system of claim 1, where an owner of the label defines two non-overlapping time slots to the Registry; prior to the first time slot, the time slots are defined to map the label to another label Kappa; in the first time slot Beta sends the label to the Registry; Beta gets a deep link corresponding to Kappa; Beta queries a network address in the deep link; the network address does not respond; Beta tells the Registry; the Registry tells the owner; the Registry removes the mapping to Kappa for the second time slot.

18. The system of claim 1 with Beta maintaining a table of apps installed via a use of labels; an entry in the table includes a label and an app id; Beta installs a new app associated with a label in the table; Beta searches the table; Beta finds an app, Chi, already installed for the label; Chi is not listed in the table for another label; Beta deinstalls Chi; Beta updates the table.

19. The system of claim 18, where Beta deinstalls Chi before the new app associated with the label is installed.

* * * * *